Jan. 25, 1955

P. PANHARD 2,700,196

INFLATABLE WEATHER STRIP FOR MOUNTING
VEHICLE WINDOWS IN FRAMES

Filed Dec. 4, 1951

INVENTOR
PAUL PANHARD

BY
ATTORNEY

United States Patent Office 2,700,196
Patented Jan. 25, 1955

2,700,196

INFLATABLE WEATHER STRIP FOR MOUNTING VEHICLE WINDOWS IN FRAMES

Paul Panhard, Paris, France, assignor to Societe Anonyme des Anciens Etablissements Panhard & Levassor, Paris, France Application December 4, 1951, Serial No. 259,847

Claims priority, application France December 28, 1950

2 Claims. (Cl. 20—56.4)

This invention relates to the mounting of glass panels in their supporting frames or bays. More particularly, this invention is concerned with the water-tight and soundproof fitting of glass panels or shields in their frames.

Various suggestions have already been made in connection with this problem, especially in the manufacture of automobile bodies wherein certain elements are provided with suitably air-filled tubes of flexible, resilient material adapted to impart heat and sound insulating characteristics to the assemblies of these elements.

It is the scope of this invention to provide means for mounting glass panels in a watertight and soundproof fashion in their bays, these means consisting of a tubular member of resilient material such as natural or synthetic rubber having a special cross-sectional profile and adapted to be cemented to the inner faces of frame elements and subsequently applied by pneumatic or hydraulic pressure against both these frame elements and the edges of the glass panel which are inserted in the tubular member, if desired through another cementing operation.

The tubular member of resilient material is of continuous shape and its cross-sectional profile is circular with an approximately rectangular cavity adapted to receive the corresponding edge of the glass panel and, if desired, reinforcing inner ribs for preventing the tubular member from being flattened or deformed beyond convenient limits.

In order that the invention may be more clearly understood one practical embodiment thereof will be described hereafter with reference to the affixed drawing forming part of this specification.

Figure 1:
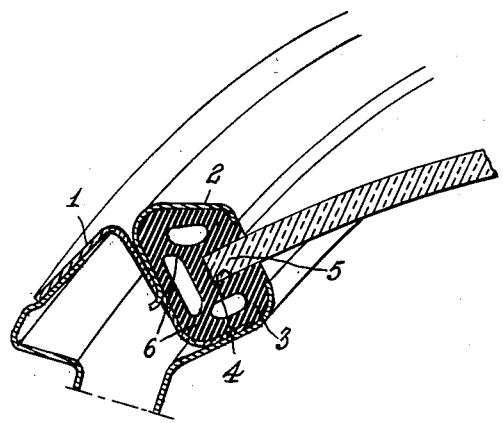
Fig. 1 is a perspective sectional view of the tubular member according to the invention applied to the mounting of an automobile windshield.

In the embodiment shown for illustrative purposes only the metal frame 1 of the windshield has fixed therein through suitable fastening means such as screws, retaining pins, rivets etc., the outer garnish stamping or molding 2 forming therewith an assembly of approximately U-shaped cross-section with the extremities of the U flanged to the inside as shown.

The edges of the glass panel 5 are fitted in a tubular member 3 of natural or synthetic rubber, this tubular member is cemented with one side in the outer garnish 2 and the resulting assembly is fixed in the frame 1 by cementing the tubular member 3 thereto if desired.

Figure 2:
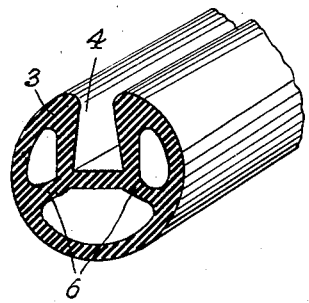
Fig. 2 is another perspective sectional view of the tubular member in its unstressed condition.

The tubular member 3 is a continuous hollow tire of substantially circular cross-section as shown in Fig. 2, with a radial, substantially rectangular cavity 4 adapted to receive the corresponding edge of the glass panel or shield 5, possibly with the interposition of a suitable cement. If desired, the tubular member 3 may be formed with internal, radial ribs 6 for improving its rigidity while permitting communication among the portions of the interior of the member 3 subdivided by the ribs.

In the specific example illustrated the mounting is effected as follows: the glass panel or shield 5 is fitted in the tubular member 3 so that the peripheral edge of the former will be concealed completely in the substantially rectangular cavity 4 of the latter. Then the glass with its insulating flexible fitting is fixed to the frame 1 as disclosed above. Finally, the tubular member 3 is inflated through pneumatic or hydraulic means by using either a valve suitably positioned along its circuit or any other convenient means (for instance a hypodermic needle). As a result, the inflated tire will be pressed with a relatively great force against the inner walls of the frames and the glass edges, the unitary pressure being constantly evenly distributed in spite of possible fabrication defects.

With this mounting the glass shield will be fitted in a water and soundproof manner in the bay.

Of course, this device may be applied to any other types of glass mounting and the cross-sectional profile of the tubular member may be varied according to the specific use to which it is intended.

What I claim is:

1. A hollow, tubular and air-tight member of substantially circular cross-section for mounting glass panels in frames, said member being formed from a flexible material and comprising, when viewed in cross-section, a hollow tubular unit having a gap formed in one portion of its peripheral wall, means including substantially parallel walls defining a linear groove projecting inwardly of said tubular member from each edge of said gap, said groove being adapted to receive the edge of the glass panel, at least two ribs extending from the bottom of and opposite said groove to the interior surface of the wall of said tubular member at points thereof positioned symmetrically on each side of the median plane of said groove.

2. A hollow, tubular and air-tight member of substantially circular cross-section for mounting glass panels in frames, said member being formed from a flexible material and comprising, when viewed in cross-section, a hollow tubular unit having a gap formed in one portion of its peripheral wall, means including substantially parallel walls defining a linear groove projecting inwardly of said tubular member from each edge of said gap, said groove being adapted to receive the edge of the glass panel, at least two ribs extending from the bottom of and opposite said groove to the interior surface of the wall of said tubular member at points thereof positioned symmetrically on each side of the median plane of said groove, said member being adapted, when fitted on the peripheral edge of the glass panel, to receive a fluid under pressure throughout its hollow interior.

References Cited in the file of this patent

UNITED STATES PATENTS

| Number | Name | Date |
|---|---|---|
| 1,604,760 | Simpson | Oct. 26, 1926 |
| 1,903,225 | Palenske | Mar. 28, 1933 |
| 1,961,352 | Hall | June 5, 1934 |
| 2,270,036 | Conlon | Jan. 13, 1942 |
| 2,430,873 | Haas | Nov. 18, 1947 |